United States Patent [19]

Bethel

[11] 4,318,809

[45] Mar. 9, 1982

[54] BI-DIRECTIONAL FILTER/DRIER HAVING MAGNETICALLY BIASED FLAPPER VALVES

[75] Inventor: Vernon V. Bethel, O'Fallon, Mo.

[73] Assignee: Emerson Electric Co., St. Louis, Mo.

[21] Appl. No.: 141,555

[22] Filed: Apr. 18, 1980

Related U.S. Application Data

[62] Division of Ser. No. 41,699, May 23, 1979, abandoned.

[51] Int. Cl.³ ............................................ B01D 33/38
[52] U.S. Cl. .................... 210/117; 210/136; 210/420; 210/428; 210/446; 137/512.15; 137/512.4; 251/65
[58] Field of Search ............... 210/117, 136, 137, 418, 210/420, 428, 435, 446, 447, 455, 456; 137/512.15, 512.4, 512.5, 544; 251/65; 55/417, 420

[56] References Cited

U.S. PATENT DOCUMENTS

| | | | |
|---|---|---|---|
| 2,774,375 | 12/1956 | Bernat et al. | 251/65 X |
| 3,891,000 | 6/1975 | Melnick | 251/65 X |
| 4,125,469 | 11/1978 | Henton et al. | 210/446 |

Primary Examiner—Charles N. Hart
Assistant Examiner—David R. Sadowski
Attorney, Agent, or Firm—Polster, Polster and Lucchesi

[57] ABSTRACT

A bi-directional filter/drier for use in a heat pump refrigerant system or the like. The filter/drier includes a cylindric filter/drier element fitted within a housing and having an axial bore therethrough. The housing has an inlet/outlet at each end thereof for connection to the refrigerant system of the heat pump for selective bi-directional flow of refrigerant therethrough. A valve assembly is provided in the housing at each end of the filter/drier element. Each valve assembly includes a flapper valve and an outlet popet valve with the flapper valves permitting refrigerant to flow from a respective inlet/outlet functioning as an inlet to the exterior of filter/drier unit and with the outlet valves permitting the refrigerant to flow from the interior bore of the filter/drier element to a respective inlet/outlet which functions as an outlet so that no matter which direction refrigerant flows through the housing, the refrigerant at all times flows from the exterior to the interior of the filter/drier element. Specifically, this invention relates to an improved flapper valve which is positively held closed either by means of a spring or by a magnet.

6 Claims, 13 Drawing Figures

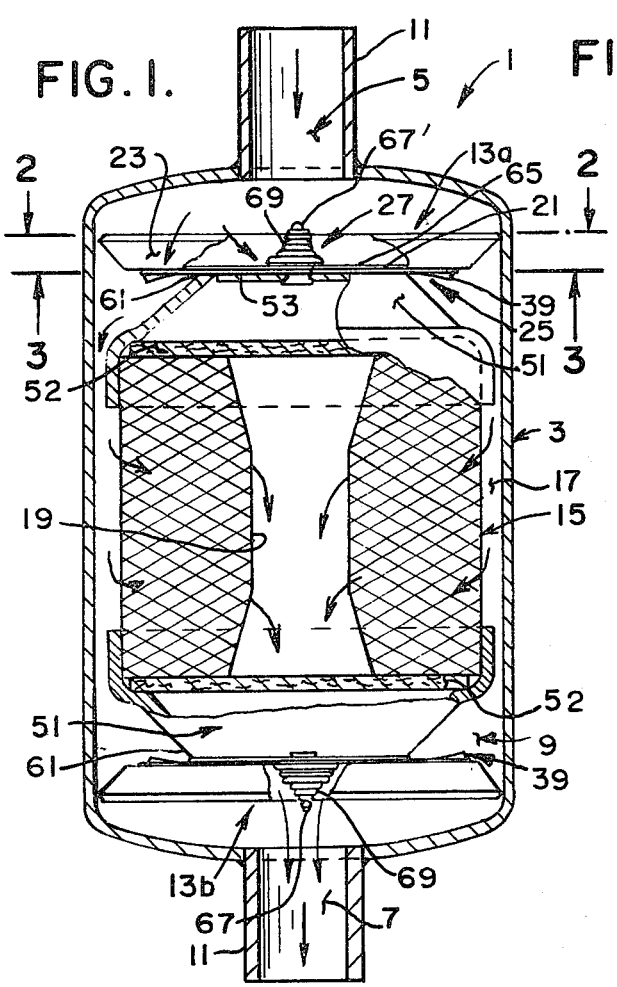
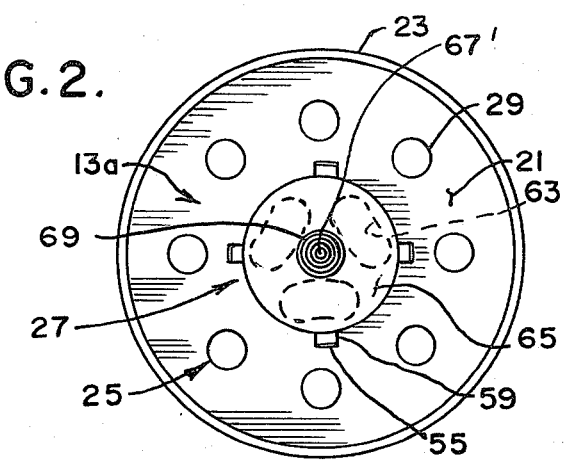
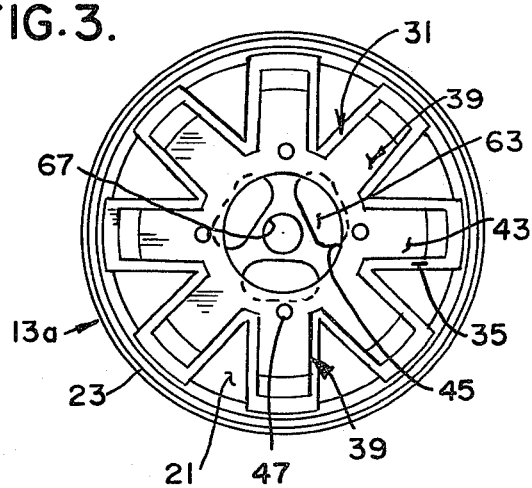
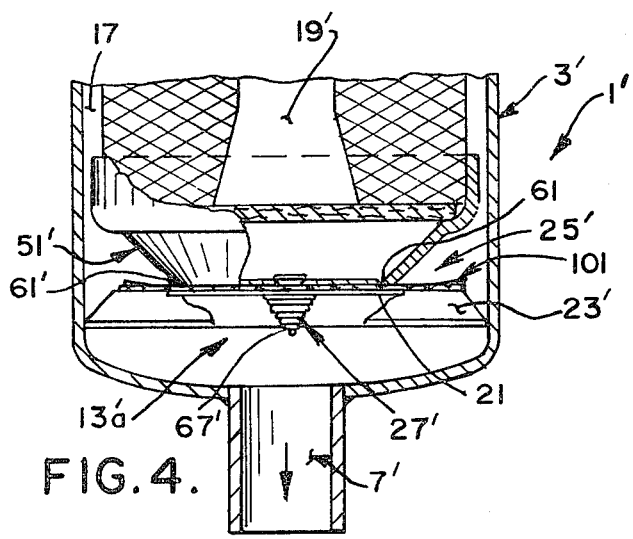
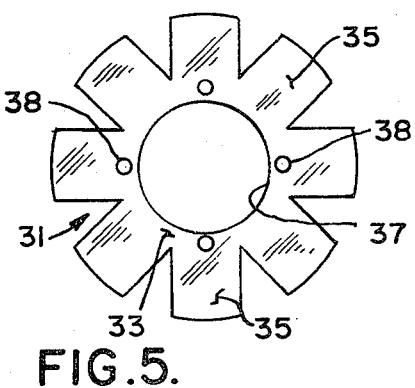

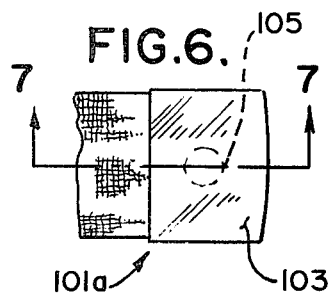
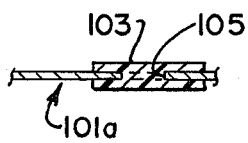
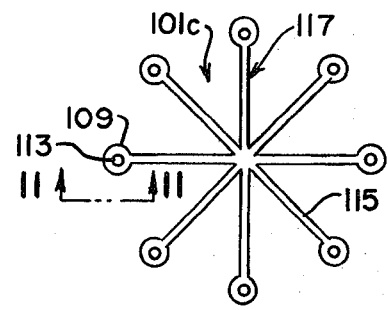
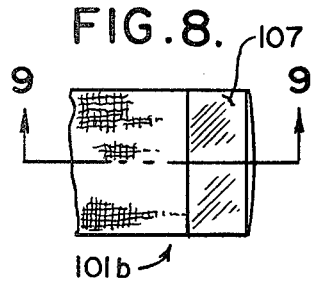
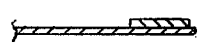
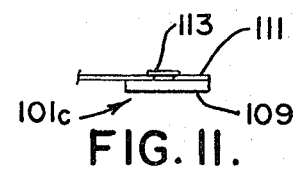
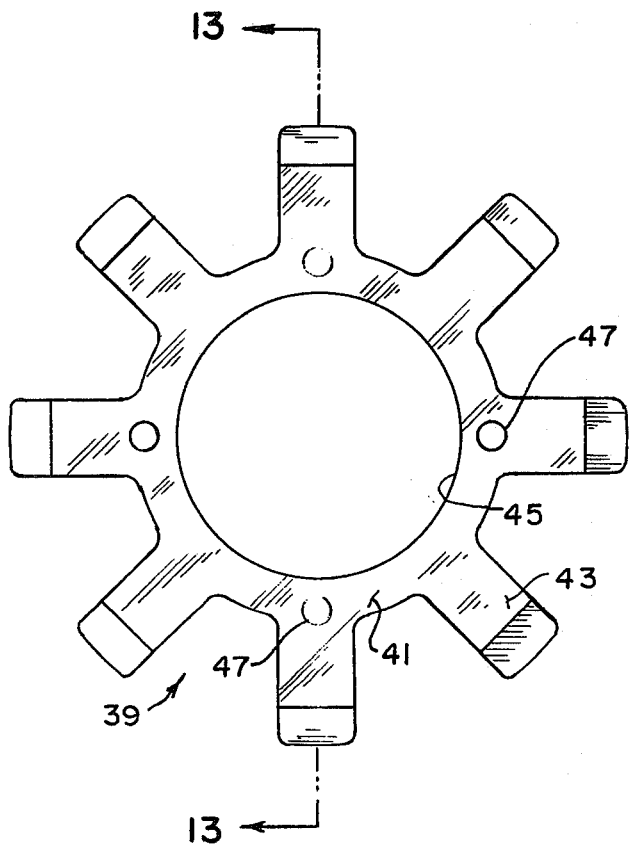
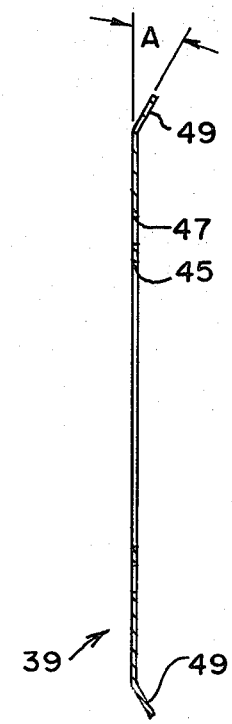

BI-DIRECTIONAL FILTER/DRIER HAVING MAGNETICALLY BIASED FLAPPER VALVES

This is a division of application Ser. No. 041,699, filed May 23, 1979 abandoned.

BACKGROUND OF THE INVENTION

This invention relates to a bi-directional filter/drier unit, such as may be incorporated in the refrigerant system of a heat pump system or the like, for filtering dirt particles, water, acid and other contaminants from the refrigerant as it flows through the heat pump system. More specifically, the bi-directional filter/drier of the present invention is an improvement of the bi-directional filter/drier unit shown in the co-assigned U.S. Pat. No. 4,125,469 issued Nov. 14, 1978 to Paul V. Henton and Roger J. Fait.

More generally, a heat pump system typically includes a compressor, a pair of heat exchanger coils and appropriate expansion valves incorporated in the refrigerant lines interconnecting the compressor and the heat exchanger coils. Typically, one of the coils is located inside the space to be heated or cooled (e.g., inside a home) and the other is located outside the space (typically, but not necessarily out-of-doors). In its heating mode, high pressure refrigerant is discharged from the output side of the compressor into the inside coil where heat is given off (i.e., the inside coil acts as a condenser). Then, the high pressure liquid refrigerant is directed to the outside coil where it is expanded so as to absorb low grade heat from the outside air. Then, the low pressure refrigerant is returned to the suction side of the compressor. In its cooling mode, the direction of the refrigerant through the system is reversed and the outside coil acts as the condenser and the inside coil acts as an expansion coil.

Typically, filters are provided in the liquid refrigerant lines of the heat pump system so as to filter dirt particles and to absorb water, acid, and other contaminants out of the refrigerant which may harm either the compressor or other components in the system. As noted in the above-mentioned U.S. Pat. No. 4,125,469, heat pumps present special problems to the design of filter/drier units because of the reversal of the direction of the flow of refrigerant causes dirt particles and contaminants entrapped within the filter to be back flushed into the system upon reversal of the direction of flow through the filter. One prior approach was to provide two separate filter/drier units, one operable only during the heating mode of operation of the heat pump and the operable only during the cooling mode. With this filter arrangement, appropriate check valves were provided to prevent reverse flow through the filters. Of course, this arrangement required two separate filter/drier units and required many connections to be made in the heat pump refrigerant system.

The bi-directional filter/drier unit disclosed in the above-noted U.S. Pat. No. 4,125,469 utilizes a flapper valve at each end of a cylindric filter/drier element to admit high pressure refrigerant to the space surrounding the exterior of the filter/drier element. The refrigerant then flows in generally radial direction from the exterior to the interior of the filter/drier element. The refrigerant then flows through an axial bore in the filter/drier element to the opposite end thereof. The filter/drier unit also contains an outlet valve at each end of the filter/drier element so as to permit filtered refrigerant to flow from the filter/drier element. Typically, the flapper valve was made from a limp sheet material, such as a liquid impervious glass fiber cloth or the like. While the above-noted bi-directional filter/drier unit represented a significant advance in the state of the art of bi-directional filter/drier units, and while this bi-directional filter/drier unit did work well for its intended purpose, a problem had been noted that under certain operating conditions, viz, the flapper valve would not, in all cases, sealably close and thus some seepage of refrigerant could occur in reverse direction through the flapper valves.

Among the several objects and features of the present invention may be noted the provision of an improved bi-directional filter/drier unit for a heat pump refrigerant system or the like generally of the type heretofore described in which the flapper valves thereof are held positively closed when in their closed positions and yet which do not unduly restrict the flow of refrigerant therethrough when open; and The provision of such a bi-directional filter/drier unit which is of simple construction, which is reliable in operation, which is low in cost to manufacture, and which has a long service life.

Other objects and features of this invention will be in part apparent and in part pointed out hereinafter.

SUMMARY OF THE INVENTION

Generally stated, a bi-directional filter/drier unit of the present invention is intended for use with a heat pump or the like, and it comprises a housing, a chamber within the housing, a first inlet/outlet at one end of the housing, and a second inlet/outlet at the other end of the housing. A filter means or element is provided within the chamber and this filter means has an interior flow passage therethrough. A first valve means is disposed within the chamber between the first inlet/outlet and an adjacent end of the filter means and a second valve means as disposed between the second inlet/outlet in the other end of the filter means. Each of these valve means includes a one-way flapper valve for permitting the flow of high pressure refrigerant from its respective inlet/outlet to the portion of the chamber surrounding the exterior of the filter means with the refrigerant flowing in general radial direction through the filter means from the exterior thereof to the internal flow passage therewithin. Each valve means further includes a one way outlet valve for the flow of refrigerant therethrough from the interior flow passage of the filter means to a respective inlet/outlet. Each of these valve means further includes a plate having a plurality of flapper holes therethrough for the flow of fluid through the flapper valve and the flapper valve further comprises a flapper member disposed on the side of the plate toward the filter means and having portions thereof overlying the flapper holes for permitting the flow of fluid through the flapper holes from its respective inlet/outlet to the exterior of the filter means when the flapper valve is open and for blocking the reverse flow of fluid when the flapper valve is closed. Specifically, the improvement of this invention comprises means for positively holding the flapper member against the plate closing the flapper openings when the flapper valve is closed and for permitting movement of the flapper member away from the plate so as to open the flapper openings in response to a differential pressure across the plate with higher pressure on the inlet/outlet side of the plate.

BRIEF DESCRIPTION OF THE DRAWINGS

FIG. 1 is a longitudinal cross-sectional view of a bi-directional filter/drier unit of the present invention having a first embodiment of improved valve means disposed within the housing at each end of the filter/drier element;

FIG. 2 is a horizontal cross section taken along line 2—2 of FIG. 1;

FIG. 3 is a horizontal cross section taken along line 3—3 of FIG. 1;

FIG. 4 is a view of a portion of another filter/drier unit illustrating another embodiment of improved valve means of the present invention;

FIG. 5 is a plan view of a flapper member;

FIG. 6 is an enlarged plan view of the outer end of one flapper arm of a flapper member, such as is shown in FIG. 5, having a molded-in-place magnet secured thereto for positively holding the end of the flapper arm against a flapper valve plate;

FIG. 7 is a cross-sectional view taken along line 7—7 of FIG. 6;

FIG. 8 is a view similar to FIG. 6 illustrating another embodiment of flapper member having a magnet bonded in place on one side of the outer end of the flapper arm;

FIG. 9 is a cross sectional view taken along 9—9 of FIG. 8;

FIG. 10 is a plan view of a series of molded magnet members or buttons arranged in a desired position and held there in place by means of break-away runners thereby enabling the series of magnet members to be installed as a unit on a flapper member;

FIG. 11 is a view similar to FIG. 6 in which one of the magnetic elements or buttons shown in FIG. 10 is secured (e.g., rivetted) to its respective flapper arm;

FIG. 12 is a plan view of a flat spring for biasing a flapper member toward its closed position; and FIG. 13 is a longitudinal cross sectional view taken along line 13—13 of FIG. 12 illustrating that the tips of the spring arms are bent in one direction for engagement with a respective flapper member.

Corresponding reference characters indicate corresponding parts throughout the several views of the drawings.

DESCRIPTION OF PREFERRED EMBODIMENTS

Referring now to the drawings, an improved bi-directional filter/drier unit of the present invention is indicated in its entirety by reference character 1 and is shown to comprise a housing 3 having an inlet/outlet 5 at one end thereof, a second inlet/outlet 7 at the other end thereof, and a chamber 9 therewithin. Inlet/outlets 5 and 7 are each provided with a suitable nipple 11 for readily enabling the filter/drier unit to be sealingly connected (e.g., brazed-in-place) within the refrigerant flow system of a heat pump or the like so that liquid refrigerant to be filtered flows in either direction through the filter, depending on whether the heat pump system is operating in its heating or cooling mode. It will be appreciated that refrigerant flow through the filter/drier unit 1 may be bi-directional. However, as shown in the drawings, and as herein explained, only one-way refrigerant flow (as noted by the arrows in FIG. 1) is herein described. It will be understood that the filter/drier unit of the present invention will operate equally well and in the same manner as herein described when subjected to reverse flow conditions.

At each end of housing 3 within chamber 9, a valve assembly, as generally indicated at 13a or 13b is provided. These valve assemblies support a filter/drier element 15 in a desired position within chamber 9 so that the filter/drier element is substantially centered within the housing and so that a space 17 surrounds the filter/drier element between the exterior thereof and the inside surface or housing 3. Filter/drier element 15 is shown to be a generally cylindric member having a longitudinal bore 19 extending therethrough. This filter/drier unit is preferably made from suitable porous material incorporating a suitable desiccant and or molecular sieve material thereby enabling the filter element to entrap dirt particles in the refrigerant and to absorb water, acids, and other contaminants. The construction and formulation of filter elements is generally known to those skilled in the art and does not per se constitute a part of the present invention.

Each valve assembly 13a or 13b is identical and thus only valve assembly 13a will be discussed in detail. Specifically, valve assembly 13a is shown to include a plate 21 having an inclined flange 23 integral therewith with a plate extending generally diametrically across the inside bore of housing 3 at one end thereof with flange 23 sealingly engaging the inner wall of the housing. Plate 21 is shown in plan view in FIG. 2 as it is reviewed from its respective (or adjacent) inlet/outlet 5. The valve assembly further includes a flapper valve assembly, as generally indicated at 25, so as to permit the flow of high pressure fluid or refrigerant from its respective inlet/outlet 5 to space 17 on the exterior of filter element 15 between valve assemblies 13a and 13b. The refrigerant flows in generally radial direction from exterior space 17 through filter/drier element body 15 to inner bore 19. Each valve assembly 13a or 13b further includes a second or outlet valve assembly, as generally indicated at 27, for permitting refrigerant under pressure within bore 19 to pass therethrough for discharge to the inlet/outlet 5 or 7 which at that time is functioning as an outlet. It will be appreciated that flapper valves 25 of each valve assembly 13a or 13b only opens upon being subjected to a positive differential pressure across its respective plate 21 with higher pressure being present on the inlet/outlet side of the plate. When the higher pressure is within space 17, the pressure serves to hold the flapper valve closed. Likewise, outlet valves 27 only open under the influence of a suitable differential pressure thereacross in which the pressure within bore 19 of filter element 15 is greater than the pressure at its respective or adjacent inlet/outlet. Thus, it can be seen that refrigerant entering housing 3 from either inlet/outlet 5 or 7 will force open the flapper valve 25 adjacent the inlet/outlet functioning as an inlet so as to admit refrigerant to be filtered into space 17 on the exterior of the filter element. the refrigerant will then flow in generally radially direction through the filter element and enter interior bore 19. The refrigerant then exerts pressure on and opens outlet valve 27 at the end of the housing opposite from the inlet/outlet which is functioning as an inlet and thus permits the filtered refrigerant to be discharged from the filter assembly. Under reverse flow conditions, flow through filter/drier 1 will occur in reverse from that described above, but it will be particularly noted that regardless of the direction of flow, that the refrigerant flows through filter element 15 always from the exterior to the interior thereof. Thus far described, the construction and operation of bi-directional filter/drier unit 1 is conventional.

As best shown in FIGS. 1–3, flapper valve 25 comprises a series of flapper or satellite holes or openings 29 in plate 21. As shown, eight flapper openings 29 are provided with these openings being spaced at equal angular intervals (e.g., 45°) on a common circle substantially concentric with the center of the plate 21. Further, a flapper member 31, as best shown in FIGS. 3 and 5, is provided on the inner face (i.e., the face toward filter element 15) of plate 21. Preferably, flapper member 31 is of a suitable limp sheet material, such as glass fiber cloth or the like which is impervious to the flow of refrigerant therethrough. As shown, flapper member 31 has a central portion 33 and a plurality of flapper arms 35, one for each flapper opening 29, with these flapper arms extending radially outwardly from central portion 33. A central opening, as indicated at 37 (see FIG. 5), is provided. As shown, flapper arms 35 extend radially outwardly and are of a width sufficient to overlie or cover flapper openings 29 in plate 21. Four securement holes 38 are provided in the flapper for purposes as will appear.

In accordance with a first embodiment of this invention, valve assemblies 13a and 13b each further include a spring, as generally indicated at 39, resiliently engageable with flapper member 31, and more particularly with each flapper arm 35, so as to positively hold the flapper arms in closed position against plate 21 closing flapper openings 29, and yet which permits the opening of the flapper openings upon application of differential pressure across the flapper openings in the manner heretofore described.

As shown in FIGS. 12 and 13, spring 39 is a flat unitary spring member formed of relatively thin sheet spring material, such as a suitable stainless steel or the like. Like flapper member 31, spring 39 has a central portion, as indicated at 41, and a plurality of spring arms 43, one for each flapper arm 35 extending generally radially outwardly from the central portion. As best shown in FIG. 3, spring arms 43 are preferably somewhat than narrower than their respective flapper arms 35. Each spring arm cooperates with its respective flapper arm so as to resiliently urge the outer ends of the flapper arms toward adjacent plate 21. Spring 39 further includes a central opening 45 and a plurality (e.g., four) of securement holes 47 which mate with securement holes 38 in flapper member 31. As best shown in FIG. 13, the outer end or tip 49 of each spring arm 43 is bent out of the flat plane of the spring at an angle as indicated at A. Each end or tip portion of the spring arm is bent to extend toward its flapper member 31 (as viewed in FIG. 1). Preferably, angle A ranges between about 40°–50°, and even more preferably is about 45°.

As best shown in FIG. 3, each spring arm 43 is of such length that its tip or outer end 49 engages its respective flapper arm 35 at a point out beyond the outer edge of its respective flapper opening 29 when the flapper valve is in its closed position (see FIG. 1). Thus, the tips of spring arms 43 force flapper arms 35 closed against the plate and a continuous seal line between each of the flapper arms and the plate is achieved. By bending tips 49 of spring arms 43 toward their respective flapper member 31, the full spring force of the spring arms is exerted on each of the flapper arms adjacent openings 29 thereby to more positively ensure that the flapper arms are positively held closed adjacent the flapper openings with the minimum amount of spring force applied thereto. Thus, not only are the flapper arms positively held closed so as to prevent leakage or seepage therethrough when the flapper valve is closed, but also the spring exerts only the minimum force required to hold the valve closed thus ensuring a minimum resistance to the opening of the flapper valve and the minimum resistance to the flow of refrigerant therethrough.

As shown, spring 39 has an outside diameter (i.e., spring arm tip to spring arm tip length) of about 1.83 inches (46.5 mm.) and a thickness of about 0.002 inches (0.051 mm.) and is of a suitable stainless spring steel, such as 302 stainless steel in its full hard condition. Of course, it will be recognized that the thickness of spring 39 and the length of spring arms 43 may be varied considerably, depending on the diameter of the flapper valve, the diameter of flapper openings 29, the desired restriction to flow of refrigerant through the flapper valve, and the desired opening differential pressure required for the flapper valve.

Valve assembly 13b is further shown to include a locating cup 51 secured to plate 21 for holding one end of filter/drier element 15 and for forming a closed flow passage between bore 19 of the filter element and outlet valve 27. Cup 51 is generally a conical shaped member of sheet metal or the like and has one end formed so as to receive the one end of the filter element. As noted at 52, a porous pad may be inserted between the end of filter element 15 and cup 51 for further filtering the flow of refrigerant therethrough and also for cushion mounting the filter element within the filter/drier unit so as to prevent abrasion of the filter element upon surges in the flow of refrigerant thereto or upon the sudden reversal of the direction of flow. Further, the other end of conical cup 51 is truncated at a right angle to the conical axis thereof and terminates in a flat surface as generally indicated at 53. This flat end 53 bears against central portion 41 of spring 39 and has an opening therethrough (not shown) coaxial with opening 45 in spring 39 and with central opening 37 in flapper member 31. Further, cup 51 is provided with a plurality (e.g., four) of bendable tabs 55 which are insertable through securement openings 47 in spring 39, through openings 38 in flapper member 31, and through openings 59 in plate 29 (see FIG. 2). With the plate, flapper member, spring and cup assembled as shown in FIG. 1, with tabs 55 inserted through openings 47, 38 and 59, and with the cup in firm compressing engagement with the spring, tabs 55 are bent over so as to firmly secure cup 51 to plate 21, to preload spring 39 so as to bias flapper arms 35 toward the inner face of plate 25, and to lock or secure flapper member 31 in place on plate 21.

As best shown in FIG. 1, cup 51 has a shoulder 61 between the upper end of its conical wall and flat end 53. In its assembled position, spring arms 45 engage shoulder 61 and thus this shoulder serves as a fulcrum for the spring arms as the spring arms are flexed away from plate 21 upon opening of the flapper valve. In other words, with spring 39 in its assembled position, its spring arms 43 are cantilevered supported at their inner ends and are freely supported at their tips 49 with their cantilevered length being substantially equal to the distance from their tips 49 to shoulder 61.

Outlet valve assembly 27 is shown to comprise a plurality (e.g., three) of oblong central openings 63 in plate 21 (shown in dotted lines in FIG. 2) and a poppet valve plate 65 overlying openings 63 on the side of plate 21 toward its adjacent inlet/outlet opening 5 or 7. A headed pin 67 holds poppet valve plate 65 in place on plate 21 and a compression coil spring 69 (see FIG. 1) surrounding pin 67 resiliently holds the poppet valve plate in engagement with plate 21 thus closing central opening 63. Of course, upon valve plate 65 being subjected to differential pressure with the higher pressure within cup 51, plate 65 will move clear of openings 63 thus permitting the flow of refrigerant therethrough. Upon the valve plate being subjected to differential pressure with the higher pressure within the space between the valve plate and its adjacent inlet/outlet 5 or 7, the differential pressure will firmly hold the valve plate closed against plate 21 thus closing central openings 63 and blocking flow therethrough. Spring 69 merely biases valve plate 65 toward its closed position. The spring constant of spring 69 is such that the biasing force extended by the spring may be readily overcome by a relatively low differential pressure.

It will be appreciated that upon the incorporation of spring 39 with a flapper valve 25 as herein described, the spring will positively hold flapper arms 35 closed against plate 21. It will further be appreciated that upon a positive differential pressure being exerted on the flapper valve such that the flapper members are forced away from plate 21, the spring will offer some additional resistance to the flow of refrigerant through openings 29 over and above the resistance that would have been present with the flapper member along (i.e., with no spring present). However, by properly selecting the characteristics of this spring such that only the minimum spring force necessary to positively hold closed the flapper valve is utilized, the effects on the resistance to the flow of refrigerant through the flapper valve can be minimized.

EXAMPLE

Tests have been conducted between a flapper valve 25 of the present invention, incorporating a preferred embodiment of the spring such as above described, and a similar flapper valve in which no spring was utilized to positively hold the flapper member closed. The flow rates of R22 refrigerant through each of the flapper valve assemblies was determined with a 2.0 PSIG pressure drop across the filter/drier unit. The flow rate of the flapper valve unit with no spring was determined to be approximately 30 lbs. of R22 refrigerant per minute, while the flow rate of the flapper valve assembly 25 of the present invention with spring 39 installed was determined to be approximately 26 lbs. of refrigerant per minute. However, since both of these flow rates are appreciably greater than the flow rates through conventional heat pump refrigerant systems, little or no penalty is incurred by the provision of spring 39 in flapper valve assembly 25 while substantial advantages are gained insuring that the flapper valve remains positively closed.

OTHER EMBODIMENTS

Referring now to FIGS. 4 and 6–11, other embodiments of the improved bi-directional filter/drier unit and of the flapper valve of this invention are illustrated. In FIG. 4, a modified bi-directional filter/drier unit 1' having a modified flapper valve, as indicated at 25', is provided in each valve assembly 13a' or 13b' as will be hereinafter described. As with flapper valve 25 heretofore described, modified flapper valve 25' includes flapper openings 29' in plate 21' and a flapper member, as generally indicated at 101 in FIG. 4. In accordance with this invention, flapper member 101 includes magnetic means for positively holding closed the portion of flapper 101 (e.g., the outer ends of the flapper arms) covering flapper openings 29 in plate 21. In this embodiment, plate 21' is made of a suitable ferro-magnetic material, such as sheet steel or the like, to which a magnet is readily attracted. In one version, flapper 101 is made of a suitable limp fabric material, such as glass fiber cloth coated with a suitable synthetic resin material so as to be impervious to the flow of refrigerant therethrough and having magnetic particles imbedded therein so as to be magnetically attracted to plate 21' and so as to positively hold the flapper member closed against the plate overlying flapper holes 29' therein. For example, flapper member 101 may be made from a suitable magnetic fabric such as is commercially available from the Industrial Products Divison of the General Tire and Rubber Company of Evansville, Indiana.

Alternatively, another construction of magnetic flapper, as generally indicated at 101a in FIG. 6., is shown in which the main body and flapper arms of the flapper member are constructed from limp cloth-like material, such as above described in regard to flapper 31, and in which magnets 103 are molded-in-place on the ends of the flapper arms so as to cover flapper openings 29 when the flapper member is in its closed position thereby to sealably magnetically hold the flapper arms closed against plate 21 surrounding the flapper openings 29 therein. As shown, an opening 105 is provided in the outer end of each flapper arm of flapper 101a and a suitable, moldable magnetic material is cast-in-place on the ends of the flapper arm such that the flapper arm is sandwiched between magnetic material layers on the outside surfaces of the flapper member with the magnetic material filling opening 105 and with the magnetic material being physically held-in-place by the magnetic material filling the opening. The magnetic material may, for example, be a suitable synthetic resin or thermoplastic material having magnetic particles or powder dispersed therein. Such a moldable magnetic material is commercially avaiable from the Industrial Products Division of General Tire and Rubber Company of Evansville, Ind. under their tradename GEN-MAG.

Alternatively, still another version of a magnetic flapper, as generally indicated at 101b in FIG. 8, is shown in which wafers 107 of a suitable magnetic material (e.g., a wafer of magnetic plastic or a steel magnet) are adhesively bonded to opposite faces of the outer ends of each flapper arm of flapper 101b.

In FIGS. 10 and 11, still another version of a magnetic flapper is generally indicated at 101c is illustrated. In this embodiment of the magnetic flapper, a set, as generally indicated at 108, of magnetic buttons 109 (there being one magnetic button for each flapper arm of the flapper) of suitable, moldable magnetic resin material, such as heretofore described, is adapted, as a unit, to be secured in place on the ends of the flapper arms of flapper member 101c, there being one button for each flapper arm. As shown in FIG. 11, each flapper arm has an opening 111 therethrough and each button 109 has a securement post 113 protruding upwardly therefrom with the securement post being received in extending through a respective opening 111 in a respective flapper arm. As shown in FIG. 10, series or set 108 of magnetic buttons 109 (for example, eight such buttons) are simultaneously molded with the buttons being in their desired spacing relative to one another such that they are in position for being installed as a unit on flapper member 101c. The buttons are held in position by means of a radial runners 115 forming unitary button assembly 108. During assembly of flapper 101c, unitary button assembly 108 is positioned on the flapper member which is generally similar to flapper 31 shown in FIG. 5, and posts 113 of each of the magnetic buttons are aligned with and are inserted through respective openings 111 provided in the outer ends of the flapper arms. With the securement posts protruding through their respective openings, a heated tool (not shown) is brought into firm engagement with the ends of the securement posts thereby to heat and to upset ends of the posts so as to in effect rivet the magnetic buttons to the flapper member. After the magnetic buttons have been secured to flapper 101c, runners 115 are readily broken away from the magnetic buttons thereby leaving the buttons in their secured positions on the ends of the flapper arms.

It will be understood that regardless of the version of the magnetic flapper member herein described, operation thereof is basically the same. More specifically, each of the magnetized flapper arms is magnetically attracted to a ferro magnetic flapper plate 21 so as to positively hold the ends of flapper arms in firm magnetic, sealing engagement with the flapper plate thereby to hold the flapper member closed and to prevent the inadvertant reverse flow or leakage of refrigerant through flapper openings 29 when the flapper valve is closed. Upon the flapper valve being subjected to a positive differential pressure (e.g., a differential pressure in which higher pressure is located on the inlet/outlet side of the flapper valve) the magentic force of the valve will be overcome and the flapper member will move away from the inner face of flapper plate 21 thereby to open the flapper valve. Once the flapper has moved away from the plate, the magnets will exert little, if any, closing force on the flapper and thus the magnetic flapper offers little or no resistance to flow beyond that experienced by a prior art flappers without any means for positively holding the flapper in its closed position.

As herein described, either spring 39 or magnetic flappers 101 constitute means for positively holding the flapper in its closed position against plate 21.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. In a bi-directional filter/drier unit for use with a heat pump or the like, said filter/drier comprising a housing, a chamber within said housing, a first inlet/outlet, a second inlet/outlet, filter means within said chamber disposed between said first and second inlet/outlet, said filter means having a flow passage therethrough, a first valve means disposed between said first inlet/outlet and an adjacent end of said filter means, and a second valve means disposed between said second inlet/outlet and the other end of said filter means, each of said valve means including a one way flapper valve for permitting the flow of high pressure refrigerant from its respective inlet/outlet to the portion of said chamber surrounding the exterior of said filter means, said refrigerant flowing in generally radial direction through said filter means from the exterior to the interior thereof, each of said valve means including a one-way outlet valve for the flow of refrigerant therethrough from said flow passage in said filter means to a respective adjacent inlet/outlet, each of said valve means including a plate and having a plurality of flapper holes therethrough for the flow of refrigerant through said flapper valve, said flapper holes being arranged in a substantially circular pattern generally centered on said plate, said flapper valve further comprising a flapper member disposed on the side of its respective plate toward said filter means and having portions thereof overlying said flapper holes for permitting the flow of refrigerant through said flapper holes from its respective inlet/outlet to the exterior of said filter means and for blocking the flow of refrigerant from the exterior of said filter means, wherein the improvement comprises: said plate for each valve means being of ferro-magnetic material, and each of said flapper valves being of limp, flexible sheet material and having a central portion and a plurality of flapper arms, one for each of said openings, each of said flapper arms extending radially outwardly from said central portion and being of such length and width so as to overlie its respective flapper hole so as to close the flapper hole when the flapper valve is closed, each of said flapper valves further including magnetic means for positively holding said flapper in closed position against said plate closing said flapper openings and for permitting movement of said flapper member away from said plate so as to open said flapper openings in response to a differential pressure across said plate with the higher pressure on the inlet/outlet side of said plate, each of said flapper arms carrying a magnet of a size sufficient to overlie its respective said flapper hole, each said magnet being secured to its flapper arm so as to magnetically hold said flapper arm against said plate all around its respective flapper hole thereby to positively close said flapper hole.

2. In a bi-directional filter/drier unit as set forth in claim 1 wherein said flapper is of flexible sheet material having a plurality of magnets secured thereto adjacent said flapper openings in said plate.

3. In a bi-directional filter/drier unit as set forth in claim 2 wherein said magnets are bonded to said flapper.

4. In a bi-directional filter/drier unit as set forth in claim 1 wherein said magnet is molded of suitable synthetic resin material having magnetic particles dispersed therein so that said magnets are integral with said flapper arms.

5. In a bi-directional filter/drier unit as set forth in claim 1 wherein said flapper includes a set of magnets, one for each flapper arm, each of said magnets having a portion thereof adapted to fit through an opening in its respective flapper arm, said magnet portion being upset so as to secure said magnet to its respective flapper arm.

6. In a bi-directional filter/drier unit as set forth in claim 5 wherein said magnets in said set are interconnected by a plurality of break-away runners joined together for holding the magnets in desired spaced relation to one another for being fitted as a unit on its respective flapper, said runners being subsequently removable from the magnets.

\* \* \* \* \*